US009451320B2

(12) United States Patent
Chen et al.

(10) Patent No.: US 9,451,320 B2
(45) Date of Patent: Sep. 20, 2016

(54) UTILIZING MULTI-DIMENSIONAL RESOURCE ALLOCATION METRICS FOR CONCURRENT DECODING OF TIME-SENSITIVE AND NON-TIME-SENSITIVE CONTENT

(75) Inventors: Xuemin Chen, Santa Fe, CA (US); Gordon Yong Li, San Diego, CA (US); Arlen J Kirchoff, Jr., Suwanee, GA (US)

(73) Assignee: BROADCOM CORPORATION, Irvine, CA (US)

( * ) Notice: Subject to any disclaimer, the term of this patent is extended or adjusted under 35 U.S.C. 154(b) by 1029 days.

(21) Appl. No.: 13/171,123

(22) Filed: Jun. 28, 2011

(65) Prior Publication Data
US 2012/0300854 A1 Nov. 29, 2012

Related U.S. Application Data

(60) Provisional application No. 61/489,152, filed on May 23, 2011.

(51) Int. Cl.
*H04N 7/15* (2006.01)
*H04N 19/18* (2014.01)
(Continued)

(52) U.S. Cl.
CPC ...... *H04N 21/4363* (2013.01); *H04L 12/1827* (2013.01); *H04N 7/15* (2013.01); *H04N 7/152* (2013.01); *H04N 19/103* (2014.11); *H04N 19/164* (2014.11); *H04N 19/184* (2014.11); *H04N 19/196* (2014.11); *H04N 21/2389* (2013.01); *H04N 21/242* (2013.01);
(Continued)

(58) Field of Classification Search
USPC ..................................... 375/240.25, E7.027
See application file for complete search history.

(56) References Cited

U.S. PATENT DOCUMENTS 6,640,248 B1 * 10/2003 Jorgensen ..................... 709/226
6,680,922 B1 * 1/2004 Jorgensen ..................... 370/328
(Continued)

OTHER PUBLICATIONS

Pahalawatte et al., "Review of Content-Aware Resource Allocation Schemes for Video Streaming over Wireless Networks," Wireless Communication and Mobile Computing, Wiley InterScience, 2007, vol. 7, pp. 131-142.*

*Primary Examiner* — Reza Aghevli
(74) *Attorney, Agent, or Firm* — Foley & Lardner LLP

(57) ABSTRACT

A video reception device, comprising a single video decoder, may dynamically allocate media-processing resources based on QoS parameters associated with the received time-sensitive and non-time-sensitive video streams. The single video decoder is utilized to decode the content of the received time-sensitive and non-time-sensitive video streams for display. The QoS parameters associated with the received time-sensitive and non-time-sensitive video streams are mapped to corresponding media-processing resource requirements at the video reception device. The video reception device performs resource allocation for the received time-sensitive and non-time-sensitive video streams based on the corresponding media-processing resource requirements. Multi-dimensional resources allocation metrics are selected or formed from the corresponding associated QoS parameters for media-processing resource allocation. The video reception device starts resource allocation for the received time-sensitive video streams. Unused portions of the allocated media-processing resources to the received time-sensitive video streams are re-allocated to process the received non-time-sensitive video streams.

20 Claims, 5 Drawing Sheets

(51) Int. Cl.
*H04N 19/19* (2014.01)
*H04N 21/4363* (2011.01)
*H04L 12/18* (2006.01)
*H04N 21/436* (2011.01)
*H04N 21/643* (2011.01)
*H04N 21/845* (2011.01)
*H04N 21/2389* (2011.01)
*H04N 21/242* (2011.01)
*H04N 21/4385* (2011.01)
*H04N 19/103* (2014.01)
*H04N 19/164* (2014.01)
*H04N 19/184* (2014.01)
*H04N 19/196* (2014.01)

(52) U.S. Cl.
CPC .... *H04N21/4385* (2013.01); *H04N 21/43615* (2013.01); *H04N 21/64322* (2013.01); *H04N 21/8456* (2013.01)

(56) References Cited

U.S. PATENT DOCUMENTS

| | | | |
|---|---|---|---|
| 8,209,733 B2* | 6/2012 | Quigley et al. | 725/114 |
| 2006/0156200 A1* | 7/2006 | Zhang et al. | 714/776 |
| 2006/0156201 A1* | 7/2006 | Zhang et al. | 714/776 |
| 2008/0068446 A1* | 3/2008 | Barkley et al. | 348/14.07 |
| 2008/0162713 A1* | 7/2008 | Bowra et al. | 709/231 |
| 2008/0273079 A1* | 11/2008 | Campbell et al. | 348/14.08 |
| 2009/0113053 A1* | 4/2009 | Van Wie et al. | 709/226 |
| 2009/0113066 A1* | 4/2009 | Van Wie et al. | 709/231 |
| 2009/0141807 A1* | 6/2009 | Krottendorfer et al. | 375/240.25 |
| 2009/0210912 A1* | 8/2009 | Cholas et al. | 725/82 |
| 2009/0217338 A1* | 8/2009 | Quigley et al. | 725/118 |
| 2010/0005176 A1* | 1/2010 | Verhoeyen et al. | 709/227 |
| 2010/0050225 A1* | 2/2010 | Bennett | 725/144 |
| 2010/0088736 A1* | 4/2010 | Besen | 725/119 |

* cited by examiner

UTILIZING MULTI-DIMENSIONAL RESOURCE ALLOCATION METRICS FOR CONCURRENT DECODING OF TIME-SENSITIVE AND NON-TIME-SENSITIVE CONTENT

CLAIM OF PRIORITY

This patent application makes reference to, claims priority to and claims benefit from U.S. Provisional Application Ser. No. 61/489,152 which was filed on May 23, 2011.

The above stated application is hereby incorporated herein by reference in its entirety.

CROSS-REFERENCE TO RELATED APPLICATIONS/INCORPORATION BY REFERENCE

This application also makes reference to:
U.S. application Ser. No. 13/171,097 filed on Jun. 28, 2011;
U.S. application Ser. No. 13/170,503 filed on Jun. 28, 2011; and
U.S. application Ser. No. 13/170,653 filed on Jun. 28, 2011.

FIELD OF THE INVENTION

Certain embodiments of the invention relate to video processing. More specifically, certain embodiments of the invention relate to a method and system for utilizing multi-dimensional resource allocation metrics for concurrent decoding of time-sensitive and non-time-sensitive content.

BACKGROUND OF THE INVENTION

Multimedia streaming applications, also known as continuous media applications, have become increasingly popular. Multimedia streaming applications may comprise time-sensitive (media) streaming applications and non-time-sensitive (media) streaming applications. Time-sensitive (media) streaming applications such as video conferencing, online TV and VoIP may be utilized to deliver time-sensitive or live media. Non-time-sensitive (media) streaming applications such as video on demand, video downloading and picture-in-picture streaming may stream pre-recorded continuous media data or content stored on so called media servers. Multimedia streaming applications may run on a wide range of consumer electronic devices, ranging from set-top boxes to PDAs and mobile phones, to receive services such as Cable-Television (CATV), and/or Internet Protocol television (IPTV) offered by service providers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing multi-dimensional resource allocation metrics for concurrent decoding of time-sensitive and non-time-sensitive content, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing multi-dimensional resource allocation metrics for concurrent decoding of time-sensitive and non-time-sensitive content. In various embodiments of the invention, a video reception device, comprising a single video decoder, may receive content of time-sensitive video streams and content of non-time-sensitive video streams. The video reception device may dynamically schedule or allocate media-processing resources available at the video reception device based on QoS parameters associated with the received time-sensitive and non-time-sensitive video streams. The single video decoder in the video reception device may be utilized to decode the content of the received time-sensitive and non-time-sensitive video streams for display. In various embodiments of the invention, the video reception device may map or translate the QoS parameters associated with the received time-sensitive and non-time-sensitive video streams to corresponding media resource requirements of the video reception device. In this regard, the video reception device may allocate media-processing resources for the received time-sensitive and non-time-sensitive video streams based on the corresponding media resource requirements. Multi-dimensional resource allocation metrics may be utilized for resource allocation, and may be selected from the corresponding associated QoS parameters. Resource allocation may start with the received time-sensitive video streams. The un-used portion of the media-processing resources allocated to the received time-sensitive video streams may be re-allocated to process the received non-time-sensitive video streams. The single video decoder may utilize the corresponding allocated media-processing resources to decode the received time-sensitive and non-time-sensitive video streams for display.

Figure 1:
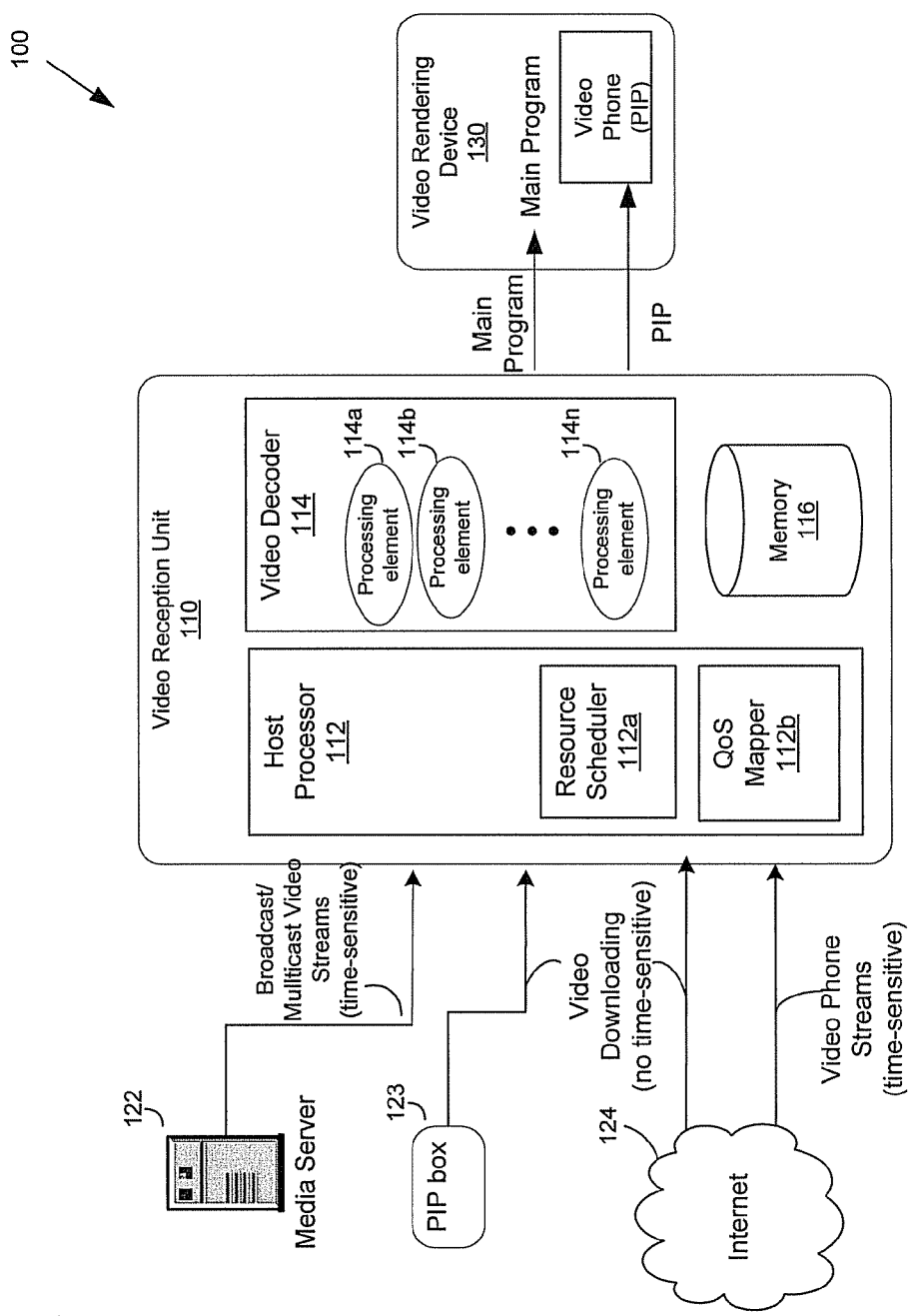
FIG. 1 is a diagram illustrating an exemplary video communication system that is operable to concurrently decode time-sensitive and non-time-sensitive media content, in accordance with an embodiment of the invention.

FIG. 1 is a diagram illustrating an exemplary video communication system that is operable to concurrently decode time-sensitive and non-time-sensitive media content, in accordance with an embodiment of the invention. Referring to FIG. 1, there is shown a video communication system 100. The video communication system 100 comprises a video reception unit 110, a media server 122, a picture in picture (PIP) box 123, the Internet 124 and a video rendering device 130.

The video reception unit 110 may comprise suitable logic, circuitry, interfaces, and/or code that may be operable to receive transport streams from service providers via the media server 122 and the Internet 124, for example. The received transport streams may comprise time-sensitive and non-time-sensitive video streams of intended services or programs. In an exemplary embodiment of the invention, the video reception unit 110 may be operable to concurrently process and/or decode the received time-sensitive and non-time-sensitive video streams using a single video decoder. The decoded time-sensitive and non-time-sensitive video streams may be provided to the video rendering device 130 for display. The video reception unit 110 may comprise a host processor 112, a video decoder 114 and a memory 116.

The host processor 112 may comprise suitable logic, circuitry, interfaces, and/or code that may be operable to handle and control operations of various device components such as the video decoder 144. The host processor 112 may comprise a resource scheduler 112a and a QoS mapper 126b. The host processor 112 may utilize the resource scheduler 112a to perform resource allocation in order to decode the received time-sensitive and non-time-sensitive video streams for display.

The resource scheduler 112a may comprise suitable logic, circuitry, interfaces, and/or code that may be operable to schedule or allocate media-processing resources for the video decoder 114. In this regard, the resource scheduler 112a may control and synchronize the video decoder 114 with the memory 116 and/or interfaces to the video rendering device 130. In various exemplary embodiments of the invention, the resource scheduler 112a may be operable to dynamically schedule media-processing resources for concurrent decoding of the received time-sensitive video and non-time-sensitive video streams via the single video decoder 114. The resource scheduler 112a may incorporate Quality of Service (QoS) parameters associated with the received time-sensitive video and non-time-sensitive video streams for resource allocation. Values of the QoS parameters may specify the characteristics of the intended services, which may specify the service quality and provide an indication of how "good" or "bad" the intended services are. In this regard, resource requirements corresponding to the values of the QoS parameters of the received time-sensitive video and non-time-sensitive video streams may be determined.

The resource scheduler 112a may perform resource allocation based on the QoS-based resource requirements. In an exemplary embodiment of the invention, multi-dimensional resource allocation metrics may be utilized to schedule or allocate media-processing resources for concurrent video decoding of the time-sensitive and non-time-sensitive video streams. In this regard, a set of QoS parameters may be selected from the QoS parameters associated with the received time-sensitive and non-time-sensitive video streams, respectively, to form resource allocation metrics. Resource allocation may be performed utilizing different resource allocation metrics for the time-sensitive and non-time-sensitive video streams may, respectively. The set of QoS parameters may be selected based on service type and/or user preferences. For example, the performance of a time-sensitive service such as VoIP application may be affected by data delay and data loss. In this regard, delay, jitter and packet loss rate may be selected to form the set of QoS parameters that may be utilized to characterize a corresponding multi-dimensional resource allocation metrics for resource allocation. In an embodiment of the invention, the resource scheduler 112a may start resource allocation with the time-sensitive video stream over the media-processing resources available at the video reception unit 110. The resource scheduler 112a may schedule or allocate spare media-processing resources, if any, to perform decoding of the non-time-sensitive streams.

The QoS mapper 112b may comprise suitable logic, circuitry, interfaces, and/or code that may be operable to map or translate the QoS parameters into corresponding resource requirements at the video reception unit 110. In an embodiment of the invention, the QoS mapper 112b may be operable to determine or generate process resource requirements from various QoS parameter values. In this regard, the QoS mapper 112b may determine a mapping or a relation between the QoS parameters associated with the received time-sensitive and non-time-sensitive streams, and required media-processing resources at the video reception unit 110 to achieve the values of the QoS parameters. Such a mapping may change over time. The determination of the mapping and relationship may occur automatically but the invention is not limited in this regard. The QoS mapper 112b may hence track and determine the mapping dynamically. The QoS mapper 112b may provide the determined QoS-based resource requirements to the resource scheduler 112a for resource allocation.

The video decoder 114 may comprise suitable logic, circuitry, interfaces, and/or code that may be operable to concurrently decode the time-sensitive and non-time-sensitive streams received from the media server 122 and the Internet 124, for example. The video decoder 114 may utilize various video decompression algorithms such as video decompression algorithms specified in MPEG-2, and/or other video formats for video decoding. Depending on the implementation, the video decoder 114 may comprise one or more processing elements 114a-114n, each of which may be configured to perform one or more specific video processing functions. For example, the processing elements 114a-114n may be utilized to perform video processing functions such as parsing, motion compensation, intra prediction, and loop filtering of picture macroblocks or picture slices. With the multiple processing elements 112a-114n, the video decoder 114 may enable parallel video decoding. In this regard, the processing elements 114a-114n may be managed or scheduled dynamically by the host processor 112.

The memory 116 may comprise suitable logic, circuitry, interfaces and/or code that may be operable to store information such as executable instructions and data that may be utilized by the video decoder 114. The executable instructions may comprise various video decompression algorithms utilized by the video decoder 114 for video decoding. The data may comprise received coded video. The memory 116 may comprise RAM, ROM, low latency nonvolatile memory such as flash memory and/or other suitable electronic data storage.

The video rendering device 130 may comprise suitable logic, circuitry, interfaces, and/or code that may be operable to receive, from the video decoder 114 of the video reception unit 110, decoded video streams for video rendering. The video rendering device 130 may be coupled to the video reception unit 110 internally or externally. The video rendering device 130 may be enabled to concurrently render multiple video streams from the video decoder 114. For example, the video rendering device 130 may concurrently render a main program (time-sensitive video stream) and a picture-in-picture (PIP) video streaming (non-time-sensitive video streams) output from the video decoder 114 for display.

In an exemplary operation, the video reception unit 110 may receive one or more time-sensitive video streams and one or more non-time-sensitive video streams transported from the media server 122 and the Internet 124, respectively. The QoS mapper 112*b* may dynamically map QoS parameters associated with the time-sensitive video and non-time-sensitive video streams into corresponding resource requirements at the video reception unit 110. The resource scheduler 112*a* may allocate media-processing resources for concurrent video decoding of the time-sensitive video and non-time-sensitive video streams. In this regard, a multi-dimensional resource allocation metric may be determined or selected for each of the received time-sensitive streams and each of the received non-time-sensitive streams, respectively. Resource allocation for media processing may start with the received time-sensitive streams over media-processing resources available at the video reception unit 110. Spare media-processing resources may be allocated or scheduled for decoding of the received non-time-sensitive video streams. The video decoder 114 may utilize the allocated media-processing resources to concurrently decode the received time-sensitive and non-time-sensitive video streams. The decoded time-sensitive and non-time-sensitive video streams may output to the video rendering device 130 for display.

Figure 2:
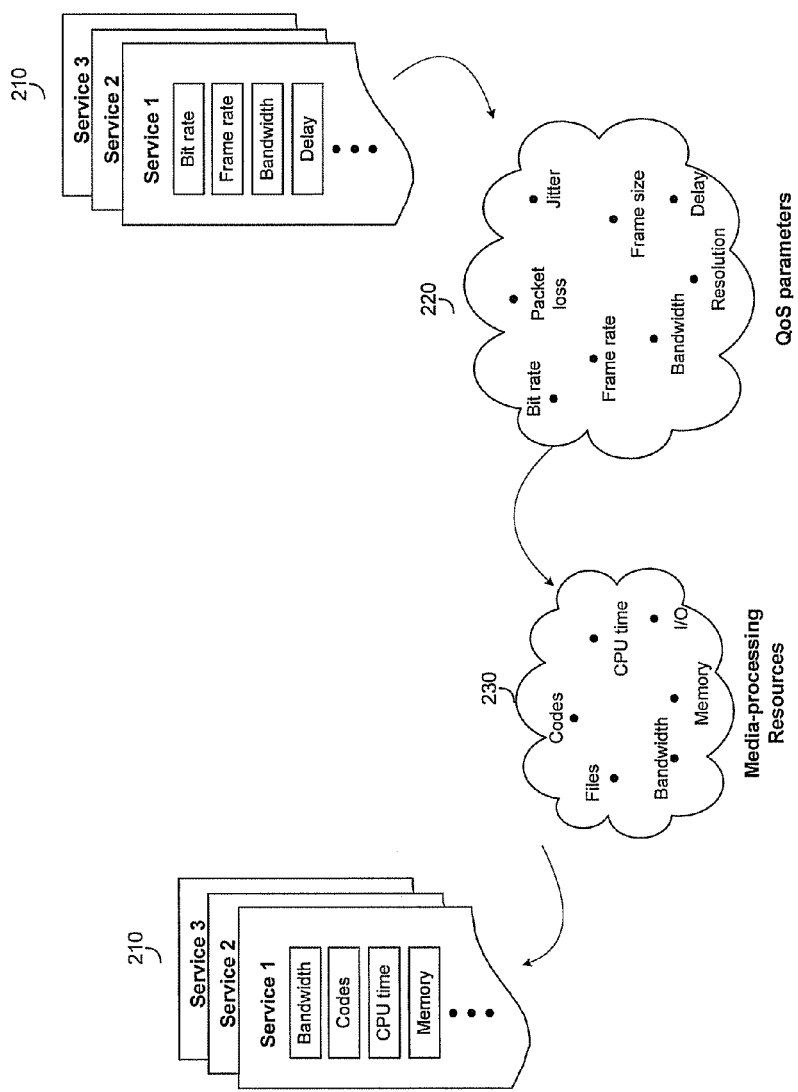
FIG. 2 illustrates an exemplary mapping between QoS parameters and required media-processing resources, in accordance with an embodiment of the invention.

FIG. 2 illustrates an exemplary mapping between QoS parameters and required media-processing resources, in accordance with an embodiment of the invention. Referring to FIG. 2, there are shown services 210 that may be described or characterized by various QoS parameters such as bit rate, bandwidth and/or delay. Services 210 may be performed at various levels of quality depending on service type, channel type, network type and/or user preferences. A QoS profile, that is, a set of QoS parameters, may be specified or defined for each one of the services 210. In this regard, at part of service setup, end-user terminals such as the video reception unit 110 may be required to reserve certain amount of media-processing resources in order to achieve or maintain selected QoS parameter values of intended services. In this regard, from the end-user points of view, services 210 may be specified by various media-processing resources 230 required at the end-user terminals to satisfy corresponding QoS parameter values of intended services. Depending on service types, for example, the media-processing resources 230 may, for example, comprise shared memory and memory segments, CPU time, CPU power, CPU-related performance tools, resource file, open files, standard files, file descriptors, hardware and/or software codes, and other hardware or software support. In an exemplary embodiment of the invention, for each intended service, the video reception unit 110 may determine a mapping between associated QoS parameters and media-processing resources required at video reception unit 110. In this regard, the services 210 that may be initially specified or defined by the QoS parameters 220 may be described or characterized by the media-processing resources 230 required at the video reception unit 110.

Figure 3:
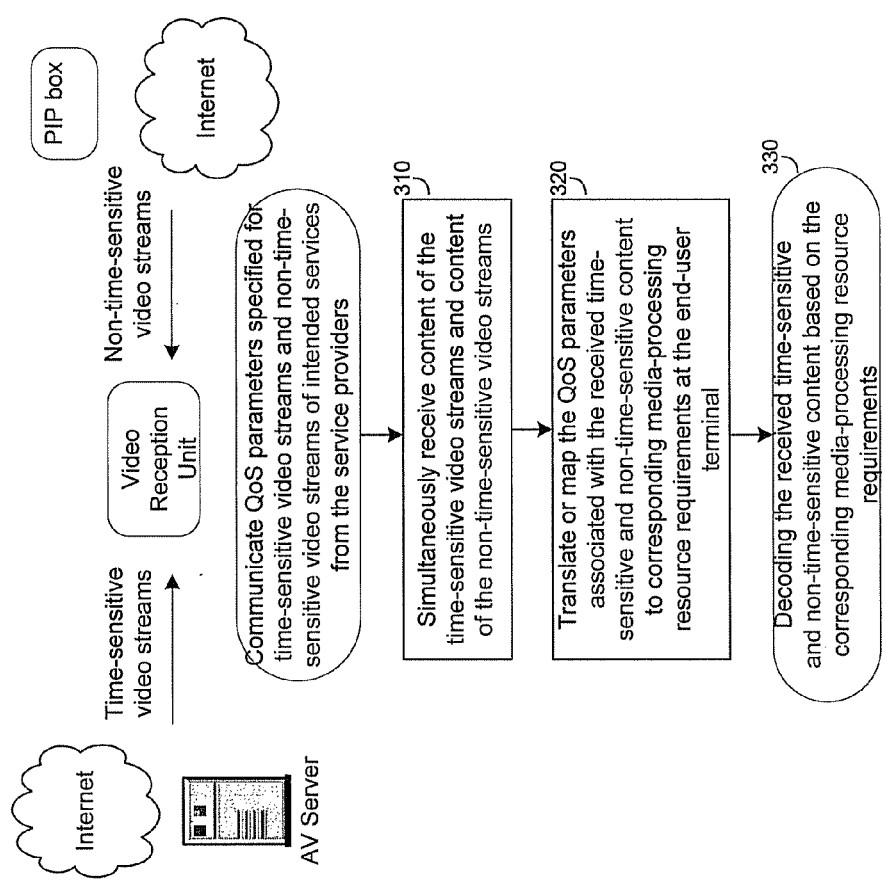
FIG. 3 is a flow chart illustrating exemplary steps that may be performed for generating multi-dimensional resource allocation metrics for concurrent decoding of time-sensitive and non-time-sensitive media content, in accordance with an embodiment of the invention.

FIG. 3 is a flow chart illustrating exemplary steps that may be performed for generating multi-dimensional resource allocation metrics for concurrent decoding of time-sensitive and non-time-sensitive media content, in accordance with an embodiment of the invention. Referring to FIG. 3, during service set up, QoS parameters specified for intended services such as time-sensitive video streams and non-time-sensitive video streams may be communicated between service providers and the video reception unit 110. The exemplary steps may begin with step 310, in which the video reception unit 110 may concurrently receive content of the time-sensitive video streams and content of the non-time-sensitive video streams. In step 320, the video reception unit 110 may be operable to translate or map QoS parameters associated with the received time-sensitive content and the non-time-sensitive content to corresponding resource requirements at the video reception unit 110. In step 330, the video reception unit 110 may concurrently decode the received time-sensitive content and the received non-time-sensitive content based on the corresponding media-processing resource requirements at the video reception unit 110.

Figure 4:
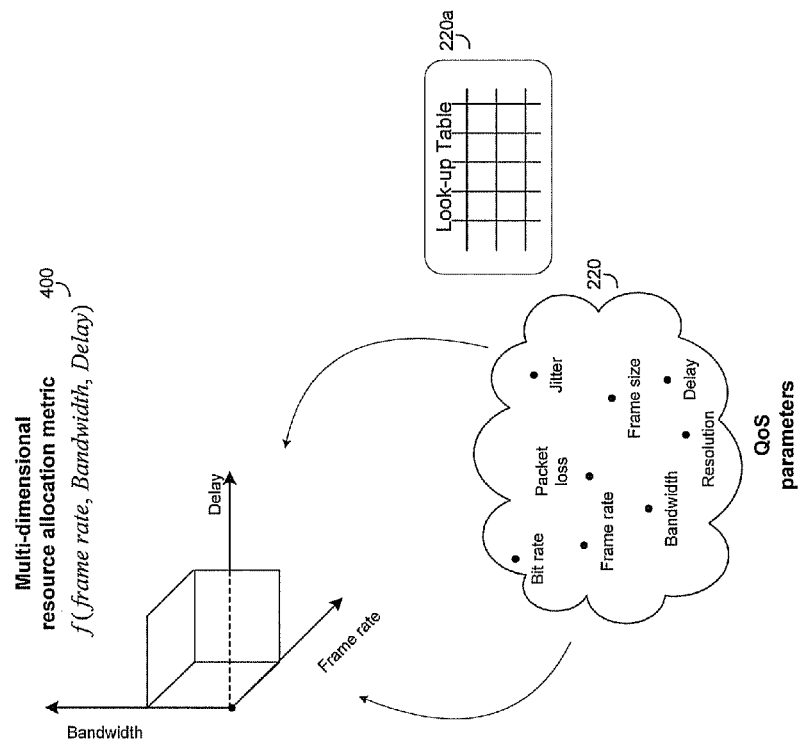
FIG. 4 is a block diagram illustrating an exemplary multi-dimensional resource allocation metric, in accordance with an embodiment of the invention.

FIG. 4 is a block diagram illustrating an exemplary multi-dimensional resource allocation metric, in accordance with an embodiment of the invention. Referring to FIG. 4, there is shown a multi-dimensional resource allocation metric 400. The multi-dimensional resource allocation metric 400 may be referred to as a metric, a measure or function that may be defined as $f(par\_1, par\_2, \ldots, par\_n)$ for resource allocation, where the parameters $par\_1$, $par\_2, \ldots, par\_n$, may be QoS parameters such as frame rate, bandwidth and delay. Each of the parameters $par\_1$, $par\_2, \ldots, par\_n$, may indicate or represent one particular dimension of the multi-dimensional resource allocation metrics 400. For example, in instances where two or more QoS parameters such as frame rate, bandwidth and delay are selected for resource allocation, the multi-dimensional resource allocation metrics 400 may be represented or formed as $f(frame\ rate, Bandwidth, Delay)$.

The selection of the QoS parameters for the multi-dimensional resource allocation metric 400 may be determined based on service type, channel type and/or network type. For example, time-sensitive services such as peer-to-peer VoIP may suffer from long delay time, large jitter and high packet loss rate, whereas non-time-sensitive services such as video downloading to the video reception unit 110 may be greatly impacted by bit rate, frame rate and bandwidth. In an exemplary embodiment of the invention, the video reception unit 110 may be operable to form or build a look-up table 220*a* to provide various mappings from multiple QoS parameters to the multi-dimensional resource allocation metric 400. The look-up table 220*a* may be stored in the video reception unit 110 and may be updated dynamically. The look-up table 220*a* may be utilized to adaptively select a set of multiple QoS parameters based on, for example, service type, channel type, network type and/or user preferences to form or construct the multi-dimensional resource allocation metric 400.

Figure 5:
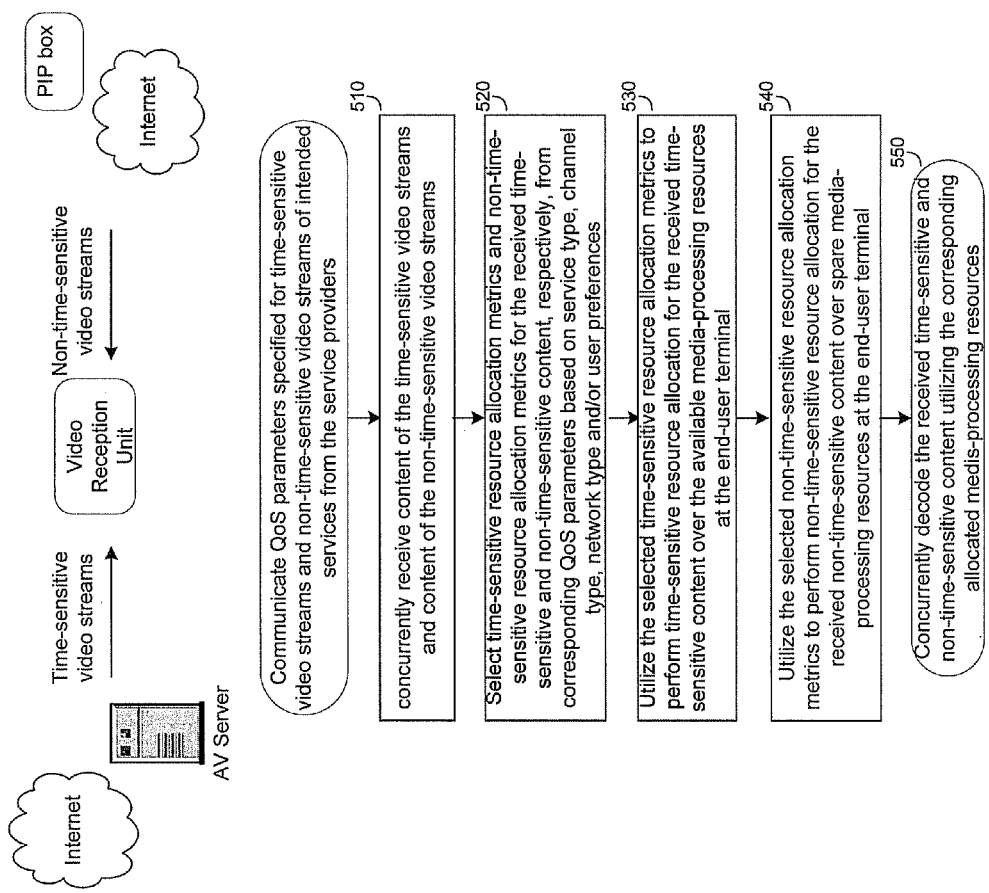
FIG. 5 is a flow chart illustrating exemplary steps that may be performed for concurrently decode time-sensitive and non-time-sensitive media utilizing multi-dimensional resource allocation metrics, in accordance with an embodiment of the invention.

FIG. 5 is a flow chart illustrating exemplary steps that may be performed for concurrently decode time-sensitive and non-time-sensitive media utilizing multi-dimensional resource allocation metrics, in accordance with an embodiment of the invention. Referring to FIG. 5, during service set up, QoS parameters specified for intended services such as one or more time-sensitive video streams and one or more non-time-sensitive video streams may be communicated between service providers and the video reception unit 110. The exemplary steps may begin with step 510, in which the video reception unit 110 may simultaneously receive content of the time-sensitive video streams and content of the non-time-sensitive video streams. In step 520, the video reception unit 110 may be operable to select time-sensitive resource allocation metrics and non-time-sensitive resource allocation metrics for the received time-sensitive and non-time-sensitive content, respectively. In this regard, multi-dimensional time-sensitive and non-time-sensitive resource allocation metrics may be selected from corresponding QoS parameters based on service type, channel type, network type and/or user preferences. In step 530, the resource scheduler 112a may utilize the selected time-sensitive scheduling metric to perform time-sensitive resource allocation for the received time-sensitive content over the available media-processing resources at the video reception unit 110. In step 540, the resource scheduler 112a may utilize the selected non-time-sensitive resource allocation metrics to perform non-time-sensitive resource allocation for the received non-time-sensitive content over spare media-processing resources at the video reception unit 110. In step 550, the video reception unit 110 may concurrently decode the received time-sensitive content and the received non-time-sensitive content utilizing the allocated media-processing resources.

Various aspects of a method and system for utilizing multi-dimensional resource allocation metric for concurrent decoding of time-sensitive and non-time-sensitive content. In various exemplary embodiments of the invention, the video reception unit 110 comprises a single video decoder 114. The video reception unit 110 may be operable to receive content of time-sensitive video streams and content of non-time-sensitive video streams. The video reception unit 110 may utilize the resource scheduler 112b to dynamically schedule or allocate media-processing resources available at the video reception unit 110 based on QoS parameters associated with the received time-sensitive and non-time-sensitive video streams. The single video decoder 114 in the video reception unit 110 may be utilized to decode the content of the received time-sensitive and non-time-sensitive video streams for display. In various embodiments of the invention, the video reception unit 110 may map or translate the QoS parameters associated with the received time-sensitive and non-time-sensitive video streams to corresponding media-processing resource requirements at the video reception unit 110. In this regard, the resource scheduler 112b may be operable to schedule or allocate media-processing resources for the received time-sensitive and non-time-sensitive video streams based on the corresponding media-processing resource requirements. Multi-dimensional resource allocation metrics may be utilized for media-processing resource allocation. More specifically, the separate multi-dimensional resource allocation metrics may be selected for the received time-sensitive and non-time-sensitive video streams, respectively, from the corresponding associated QoS parameters. The resource scheduler 112b may then utilize the selected multi-dimensional resource allocation metrics to perform media-processing resource allocation for the received time-sensitive and non-time-sensitive video streams, respectively. In an embodiment of the invention, the resource scheduler 112b may start media-processing resource allocation with the received time-sensitive video streams. The resource scheduler 112b may adaptively allocate or schedule media-processing resources for the received non-time-sensitive video streams. For example, the video reception unit 110 may monitor or track the usage of the allocated media-processing resources to the received time-sensitive video streams. In instances where a portion of the allocated media-processing resources to the received time-sensitive video streams is not utilized, the un-used portion of the allocated media-processing resources to the received time-sensitive video streams may be re-allocated to process the received non-time-sensitive video streams. The single video decoder 114 may utilize the corresponding allocated media-processing resources to concurrently decode the received time-sensitive and non-time-sensitive video streams. The video reception unit 110 may provide the decoded time-sensitive and non-time-sensitive video streams to the video rendering device 130. In this regard, the video rendering device 130 concurrently render the decoded time-sensitive and non-time-sensitive video streams to users.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing multi-dimensional resource allocation metrics for concurrent decoding of time-sensitive and non-time-sensitive content.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   in a video reception device comprising a video decoder:
      receiving time-sensitive video streams and non-time-sensitive video streams associated with a plurality of services;
      dynamically allocating media-processing resources available at said video decoder using a plurality of quality of service profiles associated with the plurality of services, each of the plurality of quality of service profiles defining at least one of a bandwidth or a delay for the service with which the quality of service profile is associated, wherein the media-processing resources are dynamically allocated using the at least one of the bandwidth or the delay defined by the plurality of quality of service profiles, wherein allocating media-processing resources available at said video decoder using a plurality of quality of service profiles associated with the plurality of services comprises:

selecting a first set of a plurality of parameters for each of the time-sensitive video streams based on a type of the service associated with the time-sensitive video stream, the first set of parameters for a time-sensitive video stream of a first type of service differing from the first set of parameters for a time-sensitive video stream of a second type of service;

selecting a second set of the plurality of parameters for each of the non-time-sensitive video streams based on the type of the service associated with the non-time-sensitive video stream;

generating a time-sensitive resource allocation metric for each of the time-sensitive video streams using a stored mapping of the plurality of parameters to the time-sensitive resource allocation metric;

generating a non-time-sensitive video resource allocation metric for each of the non-time-sensitive video streams using a stored mapping of the plurality of parameters to the non-time-sensitive resource allocation metric;

dynamically allocating a first portion of a plurality of media-processing resources available at said video decoder to the time-sensitive video streams using the time-sensitive resource allocation metrics; and dynamically allocating a second portion of the media-processing resources to the non-time-sensitive streams using the non-time-sensitive resource allocation metrics, the second portion of the media-processing resources comprising a portion of the media-processing resources remaining for allocation after the first portion of the media-processing resources are allocated to the time-sensitive video streams; and concurrently decoding by said video decoder, said received time-sensitive video streams and said received non-time-sensitive video streams utilizing said allocated media-processing resources for display.

2. The method of claim 1, comprising mapping said plurality of parameters with said received time-sensitive video streams and said received non-time-sensitive video streams to corresponding media-processing resource requirements at said video decoder.

3. The method of claim 2, comprising allocating said media-processing resources available at said video decoder for said received time-sensitive video streams and said received non-time-sensitive video streams based on said media-processing resource requirements at said video decoder.

4. The method according to claim 1, comprising adaptively adjusting said allocated second portion of the media-processing resources to said received non-time-sensitive video streams based on said allocated first portion of the media-processing resources to said received time-sensitive video streams.

5. The method according to claim 1, comprising rendering said decoded time-sensitive video streams and said decoded non-time-sensitive video streams.

6. A system for processing signals, the system comprising:
one or more circuits for use in a video reception device comprising a video decoder, said one or more circuits being operable to:
receive time-sensitive video streams and non-time-sensitive video streams associated with a plurality of services;

selecting a first set of a plurality of parameters for each of the time-sensitive video streams based on a type of the service associated with the time-sensitive video stream, the first set of parameters for a time-sensitive video stream of a first type of service differing from the first set of parameters for a time-sensitive video stream of a second type of service;

selecting a second set of the plurality of parameters for each of the non-time-sensitive video streams based on the type of the service associated with the non-time-sensitive video stream;

generating a time-sensitive resource allocation metric for each of the time-sensitive video streams using a stored mapping of the plurality of parameters to the time-sensitive resource allocation metric;

generating a non-time-sensitive video resource allocation metric for each of the non-time-sensitive video streams using a stored mapping of the plurality of parameters to the non-time-sensitive resource allocation metric;

dynamically allocating a first portion of a plurality of media-processing resources available at said video decoder to the time-sensitive video streams using the time-sensitive resource allocation metrics;

dynamically allocating a second portion of the media-processing resources to the non-time-sensitive streams using the non-time-sensitive resource allocation metrics, the second portion of the media-processing resources comprising a portion of the media-processing resources remaining for allocation after the first portion of the media-processing resources are allocated to the time-sensitive video streams; and concurrently decode, by said video decoder, said received time-sensitive video streams and said received non-time-sensitive video streams utilizing said allocated media-processing resources for display.

7. The system according to claim 6, wherein said one or more circuits are operable to map said plurality of parameters associated with said received time-sensitive video streams and said received non-time-sensitive video streams to corresponding media-processing resource requirements at said video decoder.

8. The system according to claim 7, wherein said one or more circuits are operable to allocate said media-processing resources available at said video decoder for said received time-sensitive video streams and said received non-time-sensitive video streams based on said media-processing resource requirements at said video decoder.

9. The system according to claim 6, wherein said one or more circuits are operable to adaptively adjust said allocated second portion of the media-processing resources to said received non-time-sensitive video streams based on said allocated first portion of the media-processing resources to said received time-sensitive video streams.

10. The system according to claim 6, wherein said one or more circuits are operable to render said decoded time-sensitive video streams and said decoded non-time-sensitive video streams.

11. The method according to claim 1, wherein the plurality of parameters comprises the delay, a packet loss rate, a jitter, a frame rate, a bite rate, and the bandwidth.

12. The method according to claim 1, wherein the first set of the plurality of parameters for each of the time-sensitive video streams comprises at least one of a delay, a jitter, or a packet loss rate.

13. The method according to claim 1, wherein the second set of the plurality of parameter for each of the non-time-sensitive video streams comprises at least one of a bit rate, a frame rate, or a bandwidth.

14. The method according to claim 1, wherein the plurality of services are performed at a plurality of quality levels based at least in part on service type, channel type, network type, or user preferences.

15. The method according to claim 14, wherein each of the plurality of services comprises a plurality of quality of service (QoS) parameters.

16. The system according to claim 6, wherein the plurality of parameters comprises a delay, a jitter, a packet loss rate, a bit rate, a frame rate, or a bandwidth.

17. The system according to claim 6, wherein the first set of the plurality of parameters for each of the time-sensitive video streams comprises at least one of a delay, a jitter, or a packet loss rate.

18. The system according to claim 6, wherein the second set of the plurality of parameter for each of the non-time-sensitive video streams comprises at least one of a bit rate, a frame rate, or a bandwidth.

19. A method for processing signals, the method comprising:
   in a video reception device comprising a video decoder:
      receiving time-sensitive video streams and non-time-sensitive video streams associated with a plurality of services;
      selecting a first set of a plurality of parameters for each of the time-sensitive video streams based on a type of the service associated with the time-sensitive video stream, the first set of parameters for a time-sensitive video stream of a first type of service differing from the first set of parameters for a time-sensitive video stream of a second type of service;
      selecting a second set of the plurality of parameters for each of the non-time-sensitive video streams based on the type of the service associated with the non-time-sensitive video stream;
      generating a time-sensitive resource allocation metric for each of the time-sensitive video streams using a stored mapping of the plurality of parameters to the time-sensitive resource allocation metric;
      generating a non-time-sensitive video resource allocation metric for each of the non-time-sensitive video streams using a stored mapping of the plurality of parameters to the non-time-sensitive resource allocation metric;
      dynamically allocating a first portion of a plurality of media-processing resources available at said video decoder to the time-sensitive video streams using the time-sensitive resource allocation metrics;
      dynamically allocating a second portion of the media-processing resources to the non-time-sensitive streams using the non-time-sensitive resource allocation metrics, the second portion of the media-processing resources comprising a portion of the media-processing resources remaining for allocation after the first portion of the media-processing resources are allocated to the time-sensitive video streams; and
      concurrently decoding, by said video decoder, said received time-sensitive video streams and said received non-time-sensitive video streams utilizing said allocated media-processing resources for display.

20. The system according to claim 6, wherein the first set of the plurality of parameters for each of the time-sensitive video streams comprises at least one of a delay, a jitter, or a packet loss rate; and wherein the second set of the plurality of parameter for each of the non-time-sensitive video streams comprises at least one of a bit rate, a frame rate, or a bandwidth.

* * * * *